United States Patent
Hubmann et al.

(10) Patent No.: US 6,719,216 B2
(45) Date of Patent: Apr. 13, 2004

(54) HANDLE STRAP

(75) Inventors: Curtis Hans Hubmann, Racine, WI (US); Kevin Joseph Markey, Brookfield, WI (US); Dean Ray Maune, Franklin, WI (US); Elizabeth Anne Slater, Cambs (GB); Matthew Egerton Young, Cambs (GB); Reuben Wu, Saffron Walden (GB)

(73) Assignee: JohnsonDiversey, Inc., Sturtevant, WI (US)

( * ) Notice: Subject to any disclaimer, the term of this patent is extended or adjusted under 35 U.S.C. 154(b) by 211 days.

(21) Appl. No.: 09/973,657

(22) Filed: Oct. 9, 2001

(65) Prior Publication Data

US 2003/0066848 A1 Apr. 10, 2003

(51) Int. Cl.⁷ .............................................. A01G 25/14
(52) U.S. Cl. .................................. 239/375; 222/465.1
(58) Field of Search ................ 222/465.1; 239/315, 239/349, 375; 16/111.1, 425, DIG. 24, DIG. 25

(56) References Cited

U.S. PATENT DOCUMENTS

| | | | | |
|---|---|---|---|---|
| 2,581,013 A | * | 1/1952 | Gordan | 169/89 |
| 3,638,834 A | * | 2/1972 | Goodrich et al. | 222/105 |
| 3,863,843 A | * | 2/1975 | Hechler, IV | 239/318 |
| 4,967,939 A | * | 11/1990 | Taylor | 222/196 |
| 5,101,998 A | * | 4/1992 | Hwang | 431/343 |
| 5,782,412 A | * | 7/1998 | Plantz et al. | 239/197 |
| 6,182,911 B1 | * | 2/2001 | Hanks et al. | 239/318 |

* cited by examiner

*Primary Examiner*—Gene Mancene
*Assistant Examiner*—Thach H Bui
(74) *Attorney, Agent, or Firm*—Neil E. Hamilton; Warren R. Bovee; Renee J. Rymarz

(57) ABSTRACT

A fluid dispensing assembly which includes a container defining a volume for containing a first fluid. A valve assembly is fixed to the container, and is in fluid communication with the volume. The valve assembly is connectable to a fluid conduit which supplies a second fluid to the valve assembly. A handle strap is fixed relative to the container and the valve assembly, and has a conduit support engaging the container for supporting a conduit.

35 Claims, 9 Drawing Sheets

HANDLE STRAP

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to strap handles, and more particularly to strap handles for use with a fluid dispensing bottle.

Dispensing assemblies which dispense chemical concentrates mixed with water typically include a container containing the concentrate and a valve assembly fixed to the bottle. Pressurized water supplied by a hose connected to the valve assembly flows through the valve assembly, and draws the concentrate into the valve assembly which mixes the water and concentrate in a predetermined ratio. The stream of water and concentrate exit the valve assembly through a nozzle which can be designed for spraying a mist of the mixture into the atmosphere, directing the mixture into another container, and the like.

An operator, typically, carries and operates the dispenser by grasping the valve assembly fixed to the bottle. This places significant stress on the connection between the valve assembly and nozzle. Moreover, when the hose is connected to the valve assembly, additional forces act on the valve assembly when the operator moves the dispenser to direct the mixture exiting the nozzle further weakening the connection between the container and the valve assembly.

SUMMARY OF THE INVENTION

The present invention provides a fluid dispensing assembly which includes a container defining a volume for containing a first fluid. A valve assembly is fixed to the container, and is in fluid communication with the volume. The valve assembly is connectable to a fluid conduit which supplies a second fluid to the valve assembly. A handle strap is fixed relative to the container and the valve assembly, and has a conduit support engaging the container for supporting a conduit connected to the valve assembly, and defining a handle for grasping by a user.

A general objective of the present invention is to reduce stress on the connection between the valve assembly and container when the dispenser assembly is carried by a user. This objective is accomplished by providing a handle strap which defines a handle for grasping by a user.

Another objective of the present invention is to reduce stress on the connection between the valve assembly and container when a conduit is connected to the valve assembly. This objective is accomplished by providing a handle strap which supports the conduit connected to the valve assembly.

Yet another objective of the present invention is to provide a fluid dispensing assembly which is easy to carry and support, for instance during transport and use by the user. This objective is accomplished by providing a handle strap which defines a handle for grasping by a user.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 1:
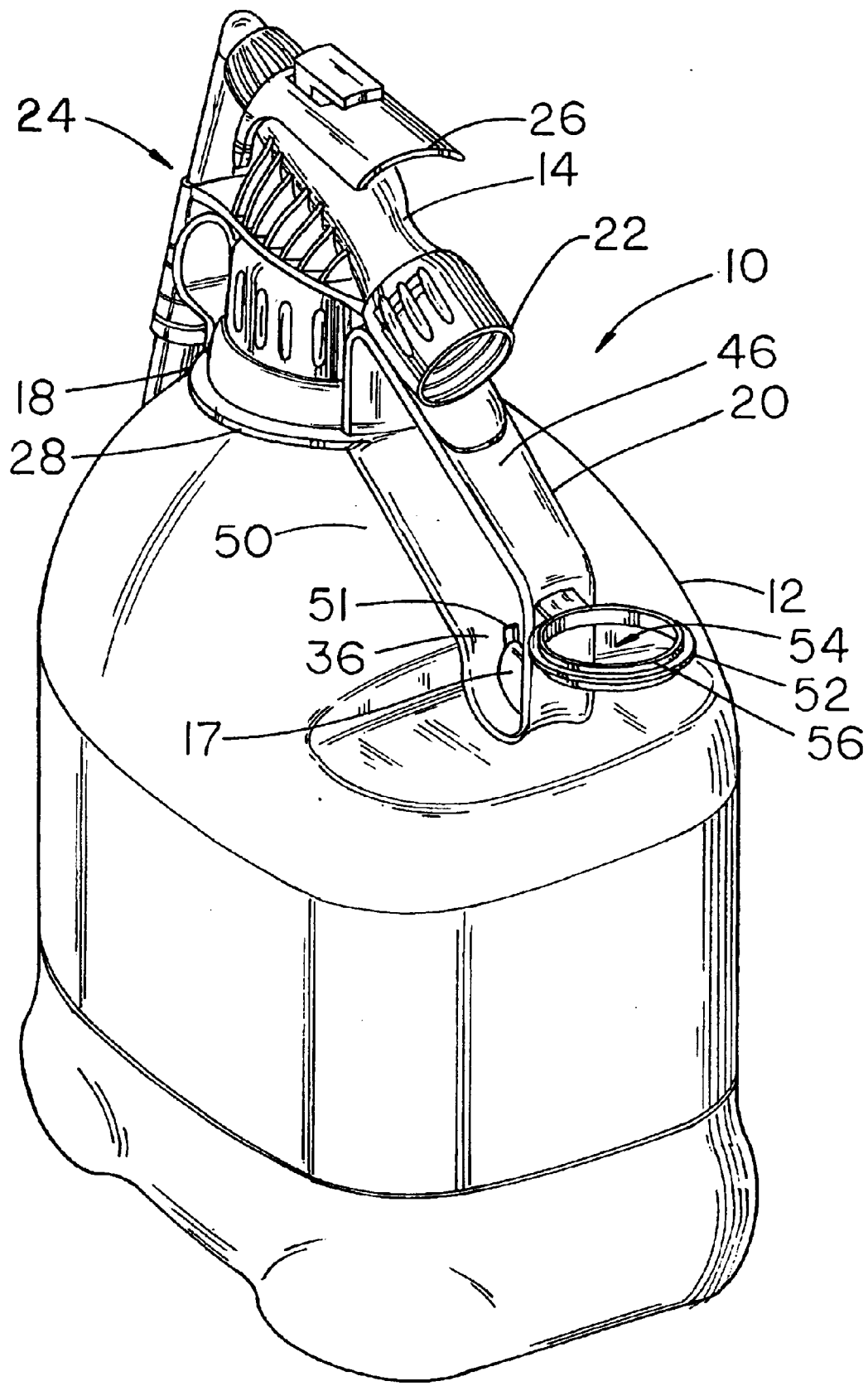
FIG. 1 is a rear perspective view of a fluid dispensing assembly incorporating the present invention.

Referring to FIGS. 1–4, a dispenser assembly 10 includes a container 12 defining a volume for holding a fluid, such as a chemical concentrate, which is dispensed through a valve assembly 14. The valve assembly 14 is detachably fixed to the container 12, and is connectable by a fluid conduit, such as a hose 16, to a source of a pressurized second fluid, such as water. A handle strap 18 fixed between the container 12 and valve assembly 14 supports the hose 16 connected to the valve assembly 14, and defines a handle 20 for carrying the dispenser assembly 10.

The container 12 can be any container known in the art which defines a volume for holding the fluid, and has an opening which provides access to the first fluid in the volume. Preferably, a neck extends outwardly from the opening for fixing the valve assembly 14 thereto. Most preferably, the neck has eternal threads which engage internal threads formed in the valve assembly 14 to detachably fix the valve assembly 14 to the container 12 over the container opening. A tab 17 extends from the container surface 50, and engages the handle strap 18 to secure the handle strap 18 to the container 12.

Figure 2:
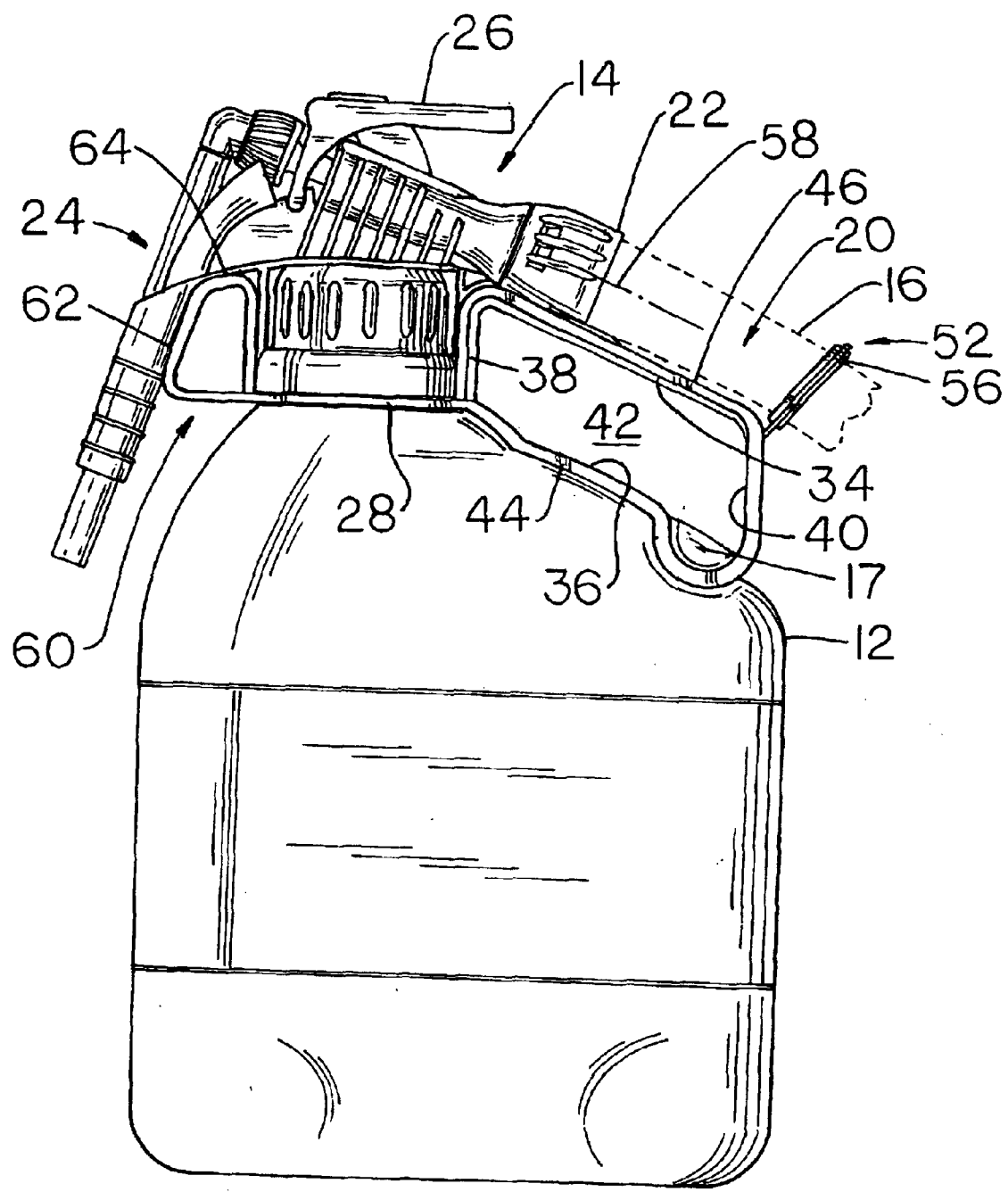
FIG. 2 is a side view of the dispensing assembly of FIG. 1.

Referring to FIG. 2, the valve assembly 14 defines a passageway therethrough, and mixes the first and second fluids in the passageway. Preferably, the valve assembly 14 includes a fitting 22 disposed at one end of the passageway and a nozzle 24 disposed at the opposing end of the passageway. The fitting 22 is sealingly connected to the hose 16 supplying the second fluid to the valve assembly 14, and the first fluid enters the passageway through a tube extending through the opening in the container 12. Valve members disposed in the passageway control the flow of the fluids through the passageway and out of the nozzle 24. A trigger 26 operatively connected to the valve members control the flow of fluids through the passageways by moving the valve members between an open position and a closed position.

The handle strap 18 is fixed relative to the container 12 and valve assembly 14, and supports the hose 16 a distance away from the container 12. The handle strap 18 includes a collar 28 which encircles the container neck, the handle 20 extending from the collar 28 supports the hose 16, and a nozzle support 60 extending from the collar 28 supports the nozzle 24. Preferably, the collar 28 is sandwiched between the valve assembly 14 and container 12 to detachably fix the handle strap 18 to the container 12. Of course, the handle strap 18 can b formed as an integral part of either the container 12 or the valve assembly 14 without departing from the scope of the present invention.

The handle 20 includes a plurality of sections 34, 36, 38, 40 which define an opening 42 for grasping by a user, and supports the hose 16 connected to the valve assembly 14. Preferably, the handle 20 includes a container engaging section 36 and a hose engaging section 34 supported on opposing ends by the end sections 38, 40. Although a plurality of discrete sections are shown, the handle 20 having the surfaces 44, 46 described below can be formed from one or more sections without departing from the scope of the present invention.

Figure 3:
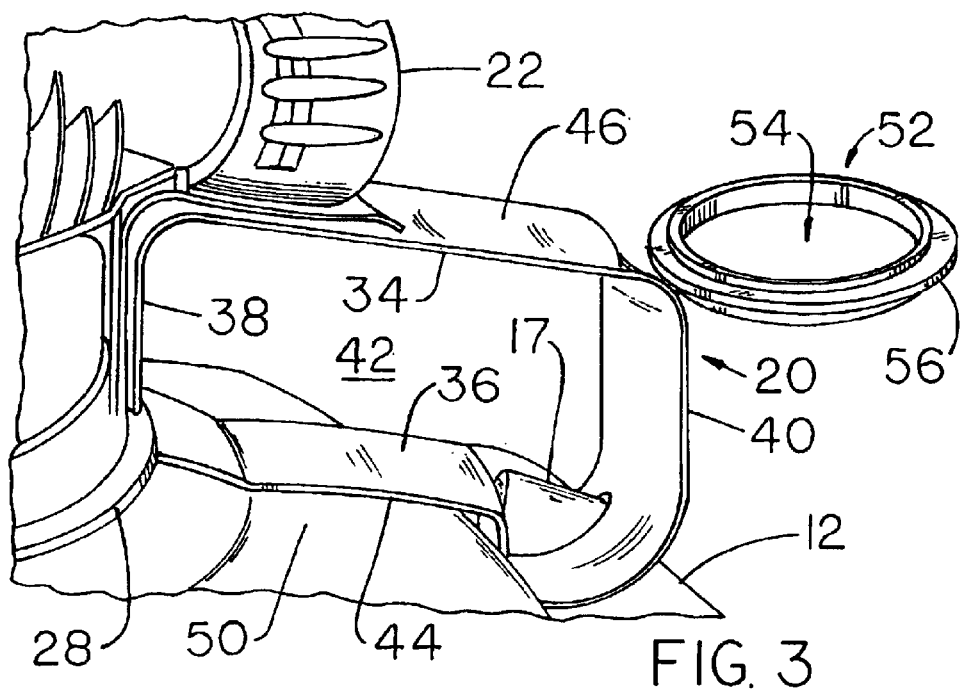
FIG. 3 is a detailed perspective view of the hose support of the handle strap of FIG. 1.

Referring to FIGS. 1–3, the container engaging section 36 includes a container engaging surface 44 which engages a surface 50 of the container 12. Preferably, the container engaging surface 44 is formed to conform to the shape of the engaged container surface 50. The hose engaging section 34 includes an outwardly facing hose engaging surface 46 which engages the hose 16 connected to the fitting 22. Preferably, at least a portion of the hose engaging surface 46 is concave to receive and cradle the hose 16. The hose engaging section 34 is spaced from the container 12 by the end sections 38, 40 which extend away from the container engaging section 36. Advantageously, spacing the hose engaging section 48 from the container 12 forms the handle opening 42. Preferably, the end section 40 spaced away from the container opening includes a concave surface for engaging the hose 16 as in the hose engaging surface 46.

A slot 51 (shown in FIG. 1) formed in the container engaging section 36 receives the tab 17 extending from the container 12. The tab 17 extends through the slot 51, and frictionally engages the handle 20 to fix the handle 20 relative to the container 12. Although fixing the handle 20 to the container 12 by frictionally engaging the tab 17 with the handle 20 is shown other methods for providing a rigid handle can be used, such as providing a sufficiently stiff handle, such that fixing the handle to the container is not necessary, or fixing the handle to the container using adhesives, welding, and the like, without departing from the scope of the present invention.

A strain relief 52 extends from the handle 20, and includes an aperture 54 defined by an annulus 56 for receiving the hose 16 connected to the fitting 22. Preferably, the annulus 56 frictionally engages the hose 16 to reduce forces transmitted by the hose 16 to the valve assembly 14. As a result, forces caused by pulling on the hose 16 are transferred to the handle strap 18 through the strain relief 52 before they can propagate to the valve assembly 14. Most preferably, the strain relief 52 is formed as an integral molded part of the handle strap 18, and is hingedly connected to the handle strap 18, such as by a living hinge, to simplify molding the handle strap 18 and strain relief 52.

Figure 4:
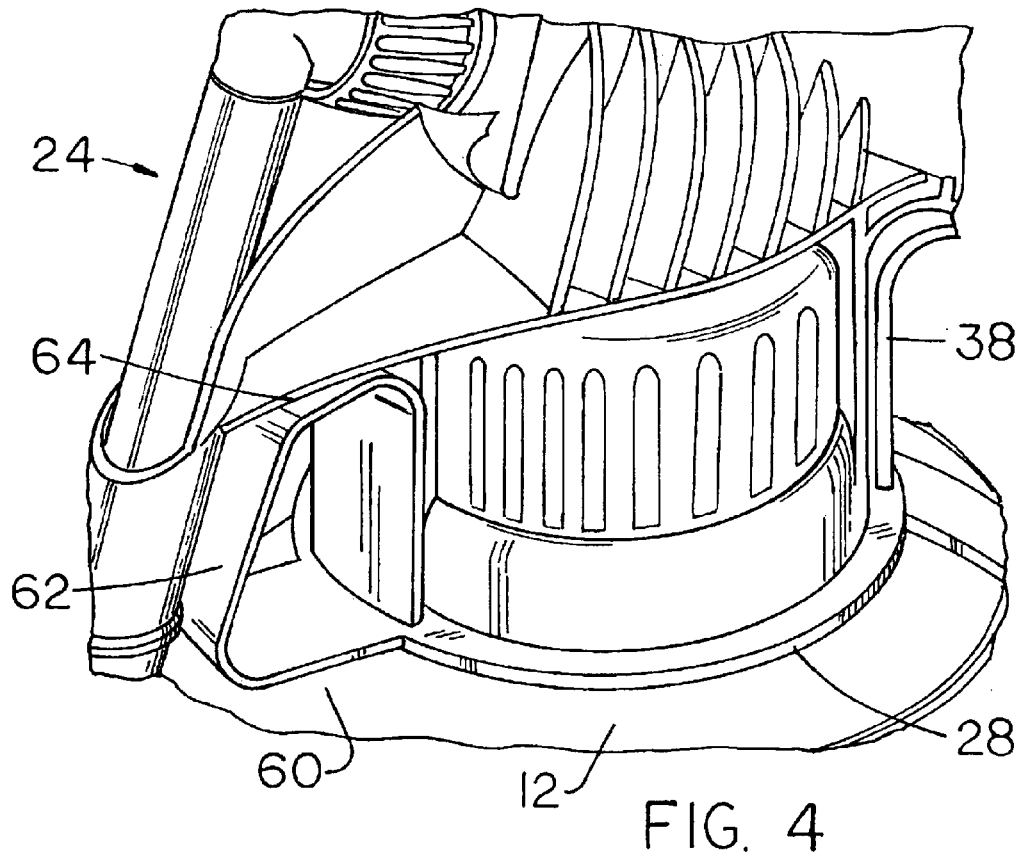
FIG. 4 is a detailed perspective view of the nozzle support of the handle strap of FIG. 1.
Figure 5:
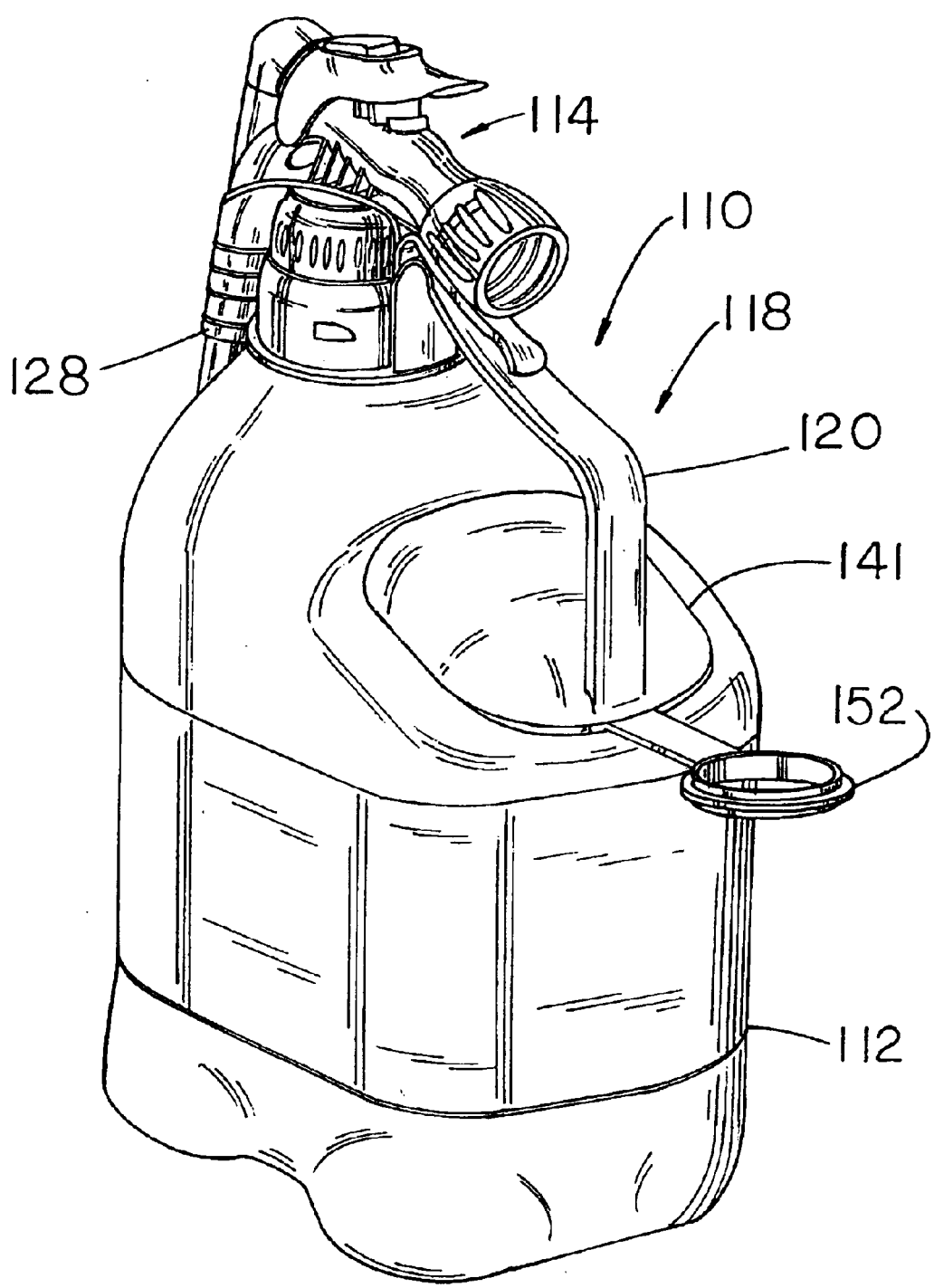
FIG. 5 is a rear perspective view of another embodiment of a fluid dispensing assembly incorporating the present invention.

Referring to FIGS. 1 and 4, a nozzle support 60 extends from the collar 28 in a direction opposite of the handle 20, and supports the valve assembly nozzle 24. The nozzle support 60 includes nozzle engaging surfaces 62, 64 which engage the nozzle 24. Of course, the number and shape of nozzle engaging surfaces is dependent upon the design of the nozzle 24 extending from the valve assembly 14. Advantageously, the nozzle support 60 can support the nozzle 24 to prevent damage by inadvertent forces forcing the nozzle 24 toward the container. Of course, the nozzle support can be provided with one or more container engaging surfaces to stiffen the nozzle support.

In use, the handle strap 18 is sandwiched between the valve assembly 14 and container 12. The hose 16 is slipped through the strain relief aperture 54, and sealingly connected to the fitting 22, such that the hose 16 engages the hose engaging surface 48 of the handle 20. An operator can carry the dispensing assembly 10 by slipping a hand through the handle opening 42.

In another embodiment shown in FIGS. 5–11, a fluid dispensing assembly 110 includes a handle strap 118 fixed relative to a container 112 and valve assembly 114. As in the first embodiment, the handle strap 118 supports a hose 116 a distance away from the container 112, and includes a collar 128 which encircles the container neck 115, the handle 120 extending from the collar 128 supports the hose.

Figure 7:
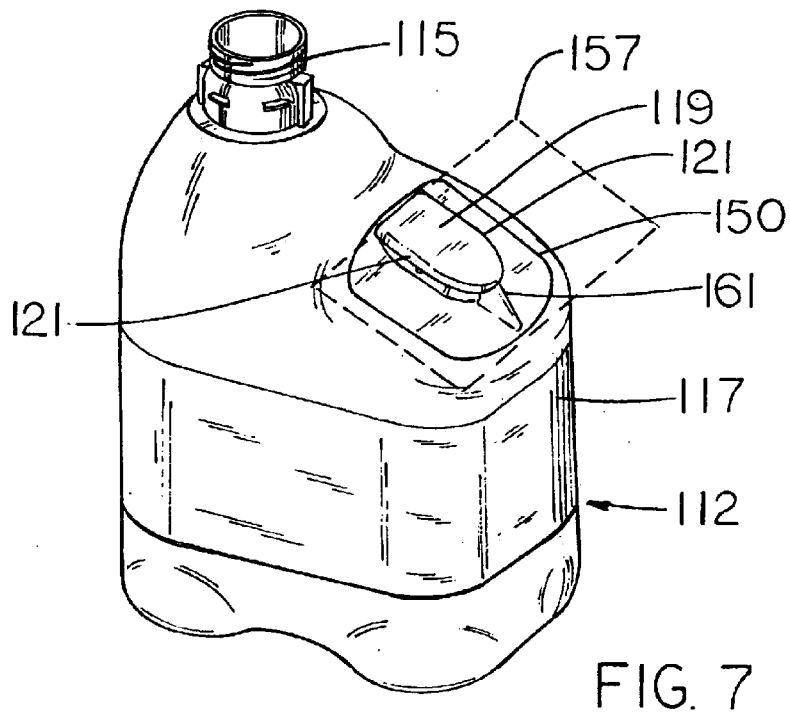
FIG. 7 is a perspective view of the container of FIG. 5.

Referring to FIG. 7, the container 112 includes the container neck 115 and a body 117 which defines a volume for containing fluid. The body 117 can be any shape defining a volume, and includes an upper surface 150 which engages the handle strap 118. The upper surface 150 has a tongue 119 which engages the handle strap 118.

Figure 7A:
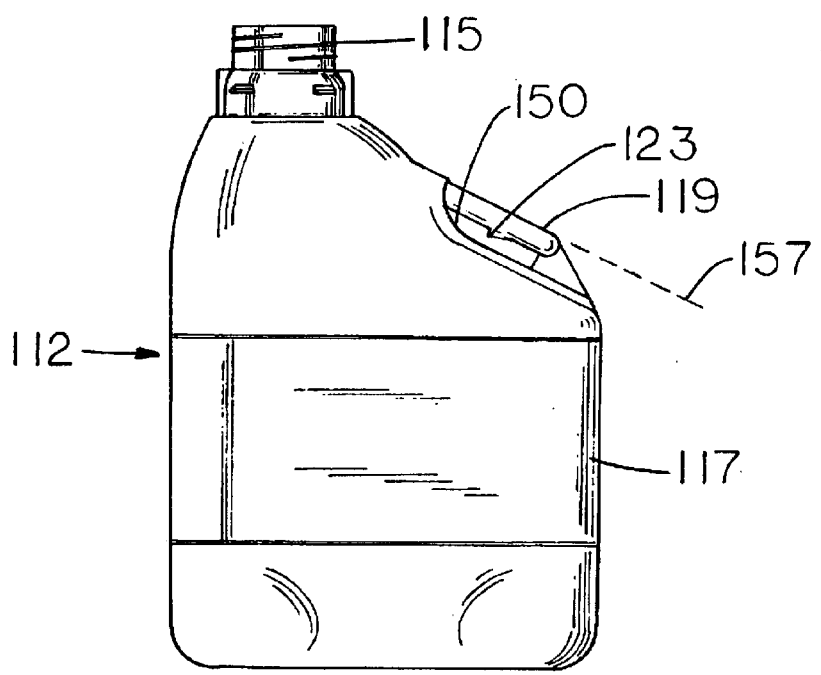
FIG. 7a is a side view of the container of FIG. 5.

The tongue 119 engages the handle strap 118 to secure the handle strap 118 to the container 112 when the container 112 is lifted by the handle 120. As shown in FIGS. 7 and 7a, the tongue 119 is formed in the upper surface 150 of the container body, and extends rearwardly and downwardly away from the container neck 115 defining a plane 157. The tongue 119 has lateral edges 121 which are spaced from the container surface 150.

Ramped tabs 123 are formed on the underside of each tongue lateral edge 121, and extend substantially perpendicular to the plane 157 defined by the tongue 119. The tabs 123 engage the handle strap 118 to inhibit disengagement of the handle strap 118 from the container 112. Although ramped tabs are disclosed, other methods for restricting movement of the handle strap can be used, such as fixing the handle strap to the container using adhesives, fasteners, and the like, without departing from the scope of the invention.

Figure 6:
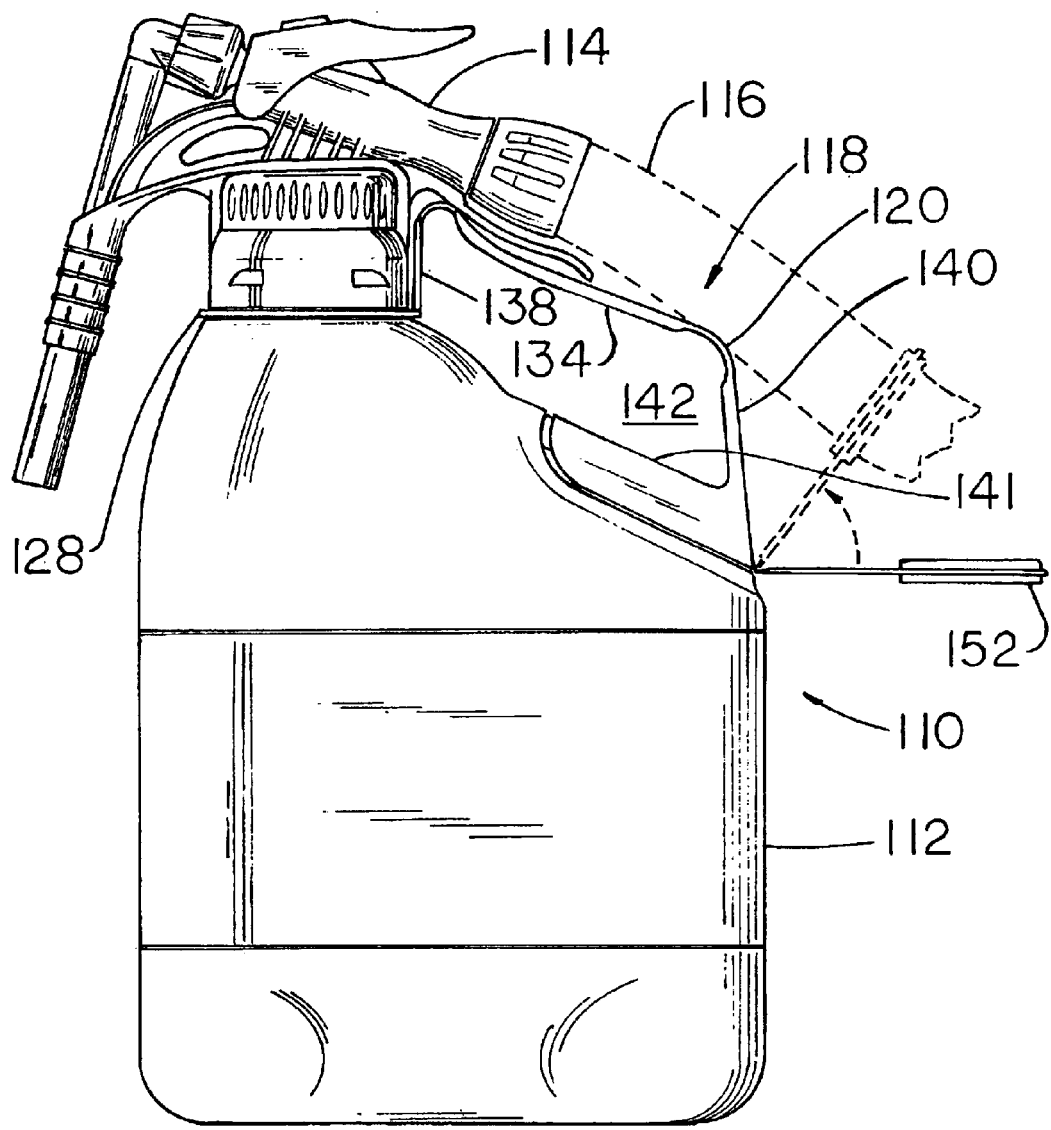
FIG. 6 is a side view of the dispensing assembly of FIG. 5.

As shown in FIG. 6, the handle 120 cooperatively defines an opening 142 with the container 112, and includes a hose engaging section 134 supported on opposing ends by end sections 138, 140. A pad 141 fixed to one end section 140 engages the container. Preferably, the hose engaging section 134 is hingedly connected to the end sections 138, 140, such as by living hinges, to allow folding the handle strap 118 during assembly to the container 112. Most preferably, a strain relief 152, such as disclosed in the first embodiment, is hingedly connected to the pad 141.

Figure 8:
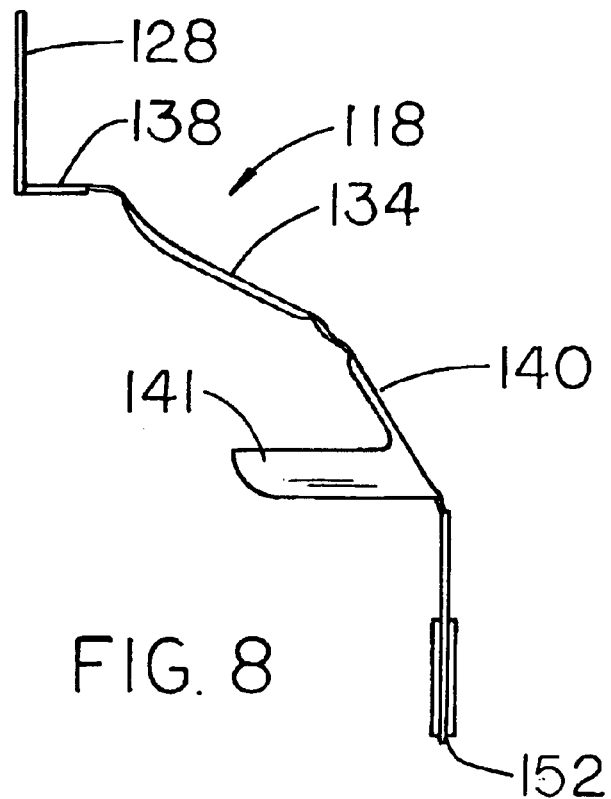
FIG. 8 is a side view of the handle strap of FIG. 5 in an unfolded configuration.
Figure 9:
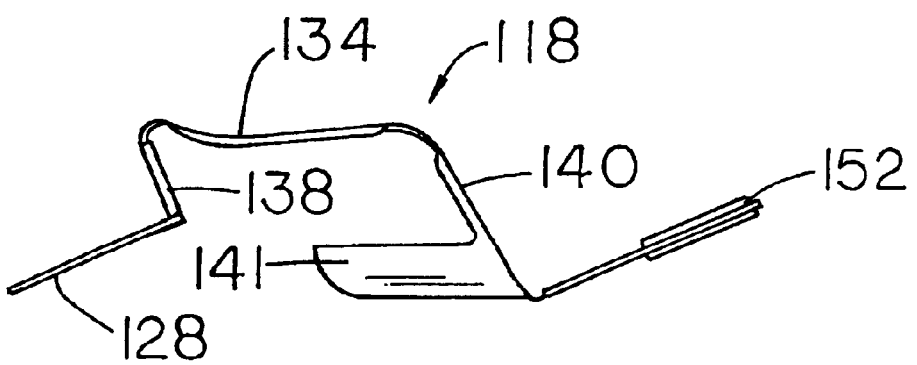
FIG. 9 is a side view of the handle strap of FIG. 5 in an folded configuration.
Figure 10:
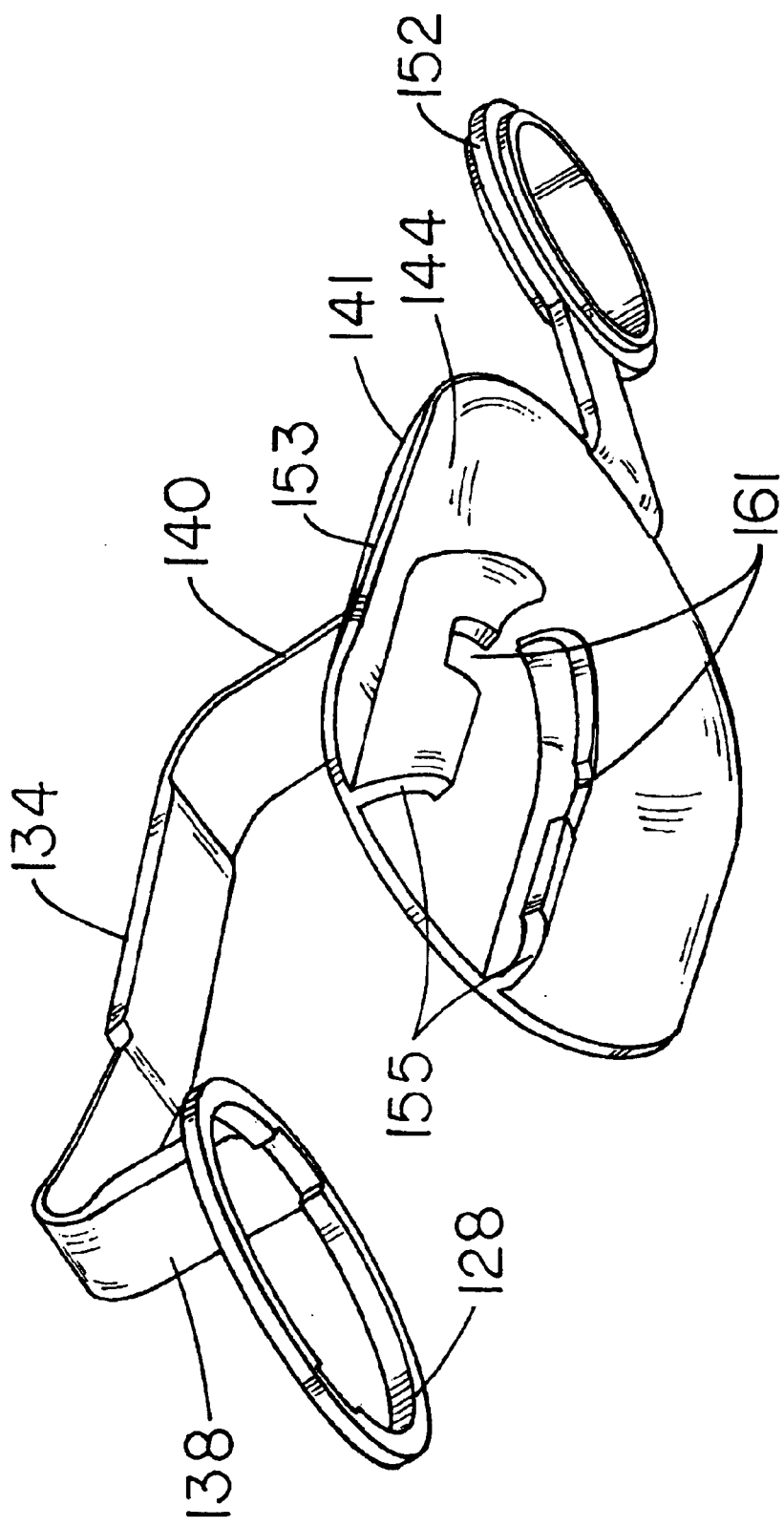
FIG. 10 is a front, bottom perspective view of the handle strap of FIG. 5.
Figure 11:
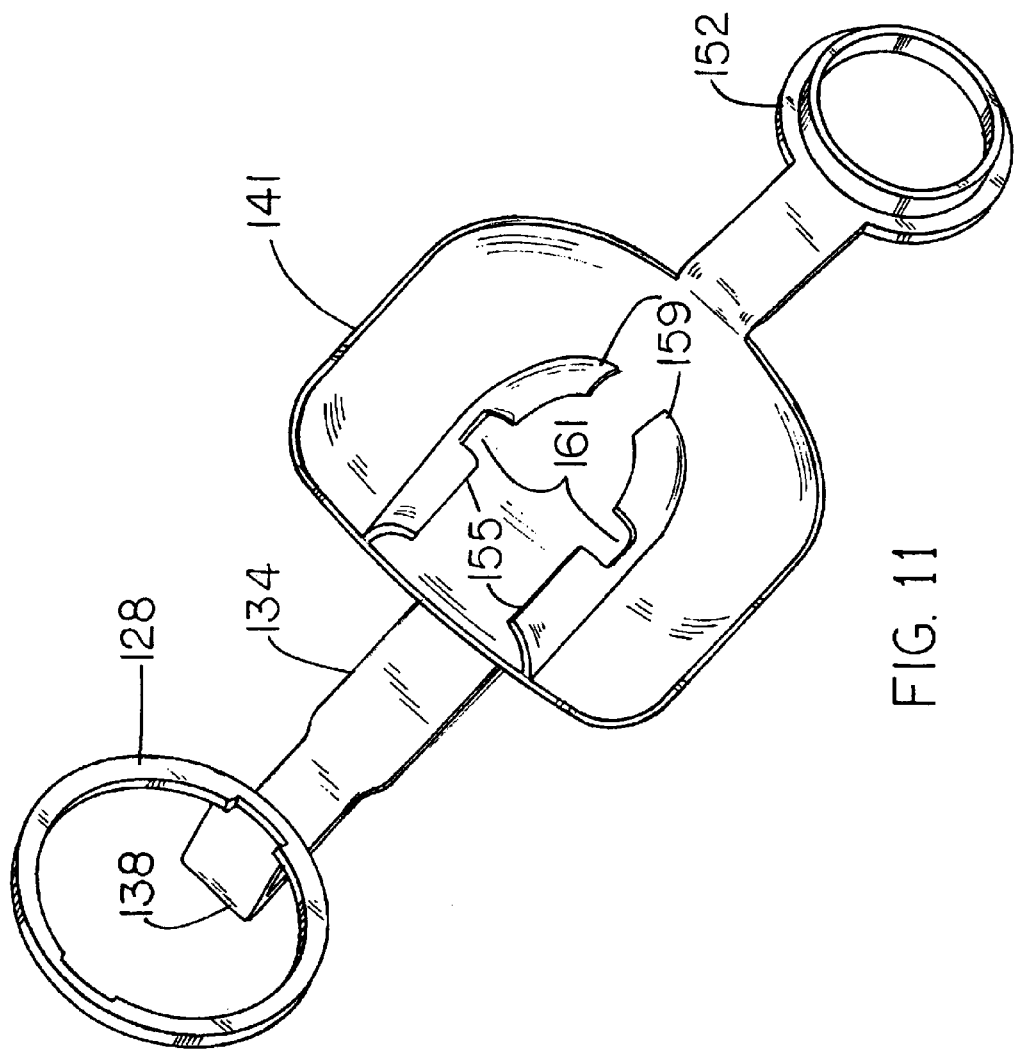
FIG. 11 is a bottom view of the handle strap of FIG. 5.

Hingedly connecting the handle sections 134, 138, and 140 and strain relief 152 allows the handle strap 118 to be molded in a form which is different than when assembled to the container 112. The flexibility provided by the hinges simplifies molding by allowing the handle 120 and strain relief 152 to be molded in an easily molded orientation, such as shown in FIG. 8, which can be folded into a different orientation, such as shown in FIG. 9, for assembly to the container.

Referring to FIGS. 7, 7a, 10, and 11, the pad 141 has an upper surface 153 fixed to the handle one end 140 and a container engaging lower surface 144. The lower surface 144 has a pair of lips 155 which mate with the tongue 119 extending from the container 112 to mechanically couple the pad 141 to the container 112. Although mechanically coupling the pad 141 to the container 112 using lips 155 and a tongue 119 is disclosed, other methods for fixing the pad to the container can be used, such as by welding, adhesives, fasteners, and the like, without departing from the scope of the present invention.

The lips 155 engage the tongue 119 to restrict movement of the pad 141 when the fluid dispensing assembly 110 is lifted by the handle 120. Each lip 155 extends from the pad lower surface 144, wraps around the tongue lateral edges 121, and extends into the space between the lateral edges 121 and container surface 150 to restrict movement of the pad 141 in a direction perpendicular to a plane 157 defined by the tongue 119 and in a direction transverse to the tongue lateral edges 121.

Movement of the pad 141 relative to the container neck 115 is further restricted by engagement of the lips 155 with the tongue 119. Each lip 155 has an arcuate distal end 159 which wraps around the tongue tip 161 to restrict movement of the pad 141 toward the container neck 115 parallel to the plane 157 defined by the tongue 119. A notch 161 formed in each lip 155 engages one of the ramped tabs 123 formed on the tongue underside, and restricts movement of the pad 141 away from container neck 115 parallel to the plane 157. Advantageously, the ramped tab 123 allows movement of the pad 141 toward the container neck 115 when affixing the handle strap 118 to the container 112, and engages the notch 161 to resist detaching the handle strap 118 from the container 112.

While there has been shown and described what are at present considered the preferred embodiments of the invention, it will be obvious to those skilled in the art that various changes and modifications can be made therein without departing from the scope of the invention defined by the appended claims.

We claim:

1. A handle strap for use with a dispensing assembly including a container, said handle strap comprising:
    a base fixable to the dispensing assembly; and
    a hose support extending from said base, and having a hose engaging surface engagable with a hose connected to the dispensing assembly, said hose engaging surface including an outwardly facing hose engaging surface and a container engaging surface engagable with a surface of the container, wherein said hose engaging surface is spaced from said container engaging surface a distance away from said container engaging surface to define a handle opening.

2. The handle strap as in claim 1, in which said base is an annular collar which can encircle a neck of the container.

3. The handle strap as in claim 1, in which at least a portion of said hose engaging surface is concave to receive the hose.

4. The handle strap as in claim 1, in which a strain relief extends from said hose support, said strain relief being engagable with a hose fixed to the dispensing assembly.

5. The handle strap as in claim 4, in which said strain relief guides said conduit along a portion of said handle strap to transfer forces exerted by said conduit to said handle strap.

6. The handle strap as in claim 4, in which said strain relief is hingedly connected to said hose support.

7. The handle strap as in claim 4, in which said strain relief frictionally engages the hose when the hose is connected to said valve assembly.

8. The handle strap as in claim 1, in which a nozzle support extends from said base, wherein said nozzle support supports a nozzle portion of the dispensing assembly.

9. The handle strap in claim 1, in which said hose support is hingedly connected to said base.

10. The handle strap as in claim 1, in which said hose engaging surface is hingedly connected relative to said container engaging surface.

11. The handle strap as in claim 1, in which said container engaging surface includes lips which are engageable with structure formed on the container to fix the container engaging surface relative to said container.

12. The handle strap as in claim 11, including at least one notch formed in at least one lip, said notch being engageable with the structure formed on the container.

13. A fluid dispensing assembly comprising:
    a container defining a volume for containing a first fluid;
    a valve assembly fixed to said container, and in fluid communication with said volume, said valve assembly being connectable to a fluid conduit which supplies a second fluid to said valve assembly; and
    a handle strap fixed relative to said container and said valve assembly, said handle strap including a conduit support engaging said container for supporting the conduit when connected to said valve assembly, said conduit support including an outwardly facing hose engaging surface and defining at least a portion of a handle for grasping by a user.

14. The relief dispensing assembly as in claim 13, in which said conduit support includes a conduit engaging surface engagable with the conduit connected to said valve assembly and a container engaging surface engagable with a surface of said container, wherein said conduit engaging surface is spaced from said container engaging surface a distance away from said container engaging surface to define a handle opening.

15. The fluid dispensing assembly as in claim 14, in which at least a portion of said conduit engaging surface is concave to receive the conduit.

16. The fluid dispensing assembly as in claim 14, in which said hose engaging surface is hingedly connected relative to said container engaging surface.

17. The fluid dispensing assembly as in claim 14, in which said container engaging surface is fixed to said container.

18. The fluid dispensing assembly as in claim 14, in which said container engaging surface includes lips, and said container includes structure which engages said lips to fix the container engaging surface relative to said container when said container is lifted by said handle.

19. The fluid dispensing assembly as in claim 18, in which at least one notch is formed in at least one lip, and said notch engages said structure to inhibit disengagement of said handle strap from said container.

20. The fluid dispensing assembly as in claim 13, in which said conduit support includes a strain relief engagable with the conduit when engaged with said conduit support to reduce forces acting on said valve assembly by the conduit.

21. The fluid dispensing assembly as in claim 20, in which said strain relief guides said conduit along a portion of said handle strap to transfer forces exerted by said conduit to said handle strap.

22. The fluid dispensing assembly as in claim 20, in which said strain relief frictionally engages the hose when the hose is connected to said valve assembly.

23. The fluid dispensing assembly as in claim 20, in which said strain relief is hingedly connected to said conduit support.

24. The fluid dispensing assembly as in claim 13, in which said handle strap includes a nozzle support engaging said container for supporting a nozzle extending from said valve assembly.

25. The fluid dispensing assembly as in claim 13, in which said handle strap is fixed to said container by an annular collar encircling a neck of the container.

26. The fluid dispensing assembly as in claim 13, in which said handle strap is sandwiched between said valve assembly and said container.

27. A fluid dispensing assembly comprising:
   a container defining a volume for containing a first fluid;
   a valve assembly fixed to said container, and in fluid communication with said volume, said valve assembly being connectable to a fluid conduit which supplies a second fluid to said valve assembly;
   a handle strap fixed relative to said container and said valve assembly, said handle strap including a conduit support engaging said container for supporting the conduit when connected to said valve assembly, said conduit support including a conduit engaging surface engagable with the conduit connected to the valve assembly, said conduit support including an outwardly facing hose engaging surface and a container engaging surface engagable with a surface of said container, wherein said conduit engaging surface is spaced from said container engaging surface a distance away from said container engaging surface to define a handle opening; and
   a strain relief extending from said handle strap, and engagable with the conduit when the conduit is engaged with said conduit support, wherein said strain relief guides said conduit along a portion of said handle strap to transfer forces exerted by said conduit to said handle strap.

28. The fluid dispensing assembly as in claim 27, in which at least a portion of said conduit engaging surface is concave to receive the conduit.

29. The fluid dispensing assembly as in claim 27, in which said handle strap includes a nozzle support engaging said container for supporting a nozzle extending from said valve assembly.

30. The fluid dispensing assembly as in claim 27, in which said strain relief frictionally engages the hose when the hose is connected to said valve assembly.

31. The fluid dispensing assembly as in claim 27, in which said strain relief is hingedly connected to said conduit support.

32. The fluid dispensing assembly as in claim 27, in which said hose engaging surface is hingedly connected relative to said container engaging surface.

33. The fluid dispensing assembly as in claim 27, in which said container engaging surface is fixed to said container.

34. The fluid dispensing assembly as in claim 27, in which said container engaging surface includes lips, and said container includes structure which engages said lips to fix the container engaging surface relative to said container when said container is lifted by said handle.

35. The fluid dispensing assembly as in claim 34, in which at least one notch is formed in at least one lip, and said notch engages said structure to inhibit disengagement of said handle strap from said container.

* * * * *